US012687503B2

(12) United States Patent
Lee et al.

(10) Patent No.: US 12,687,503 B2
(45) Date of Patent: Jul. 21, 2026

(54) SYSTEM AND METHOD FOR DETECTING DANGEROUS SUBSTANCE BY USING ARTIFICIAL INTELLIGENCE

(71) Applicant: REPUBLIC OF KOREA (CHIEF OF PRESIDENTIAL SECURITY SERVICE), Seoul (KR)

(72) Inventors: Hyun Woo Lee, Seoul (KR); Je Hwan Jeon, Seoul (KR)

(73) Assignee: REPUBLIC OF KOREA (CHIEF OF PRESIDENTIAL SECURITY SERVICE), Seoul (KR)

( * ) Notice: Subject to any disclaimer, the term of this patent is extended or adjusted under 35 U.S.C. 154(b) by 198 days.

(21) Appl. No.: 18/281,389

(22) PCT Filed: Mar. 8, 2022

(86) PCT No.: PCT/KR2022/003322
§ 371 (c)(1),
(2) Date: Sep. 11, 2023

(87) PCT Pub. No.: WO2022/191618
PCT Pub. Date: Sep. 15, 2022

(65) Prior Publication Data
US 2024/0151658 A1 May 9, 2024

(30) Foreign Application Priority Data
Mar. 11, 2021 (KR) ........................ 10-2021-0031911

(51) Int. Cl.
*G01N 23/04* (2018.01)
*G01N 23/083* (2018.01)
(Continued)

(52) U.S. Cl.
CPC ........... *G01N 23/04* (2013.01); *G01N 23/083* (2013.01); *G01N 23/10* (2013.01); *G06N 3/04* (2013.01)

(58) Field of Classification Search
CPC ...... G01N 23/04; G01N 23/083; G01N 23/10; G01N 2223/643; G01N 2223/04;
(Continued)

(56) References Cited

U.S. PATENT DOCUMENTS 6,678,396 B2 1/2004 Bartle
7,769,132 B1 8/2010 Hurd et al.
(Continued)

FOREIGN PATENT DOCUMENTS

JP 2009-122108 A 6/2009
JP 2021-26742 A 2/2021
(Continued)

OTHER PUBLICATIONS

Qingqing et al. "Application of Machine Learning Methods for Material Classification with Multi-energy X-Ray Transmission Images", Springer Nature Switzerland AG 2019, p. 194-204 (Year: 2019).*
(Continued)

*Primary Examiner* — Uzma Alam
*Assistant Examiner* — Mamadou Faye
(74) *Attorney, Agent, or Firm* — Hauptman Ham LLP

(57) ABSTRACT
The present invention relates to a system and a method for detecting a dangerous substance by using artificial intelligence. The present invention is characterized in that a dangerous substance can be rapidly detected from substances being inspected at airports, ports, military bases, event venues, stadiums, exhibition halls, concert halls, government office buildings, or venues where VIP protection is sought, by learning the X-ray color of each dangerous substance through deep learning, using the property that a
(Continued)

130 element deriving means 60 | training engine 70 | taking-action means 80 text conversion module 61 information extraction module 62 element deriving module 63 organizing module 71 | construction module 72 | training module 73 understanding and scheduling module 81 determination and prediction module 82 recommendation and taking-action module 83 color indicated by a constituent atom of a substance being inspected with the highest atomic number in the periodic table is displayed when the substance being inspected is irradiated with X-rays from an X-ray instrument.

10 Claims, 9 Drawing Sheets

(51) Int. Cl.
    *G01N 23/10*     (2018.01)
    *G06N 3/04*     (2023.01)

(58) Field of Classification Search
    CPC ..... G01N 2223/1016; G01N 2223/403; G01N 2223/639; G06N 3/04; G06N 3/08; G01V 5/22
    See application file for complete search history.

(56)             References Cited

U.S. PATENT DOCUMENTS

| | | | |
|---|---|---|---|
| 8,165,268 | B1 | 4/2012 | Hurd et al. |
| 8,290,230 | B2 | 10/2012 | Chen et al. |
| 8,515,010 | B1 | 8/2013 | Hurd et al. |
| 8,897,415 | B2 | 11/2014 | Hurd et al. |
| 9,111,331 | B2 | 8/2015 | Parikh et al. |
| 9,632,206 | B2 | 4/2017 | Parikh et al. |
| 10,422,919 | B2 | 9/2019 | Parikh et al. |
| 10,509,142 | B2 | 12/2019 | Parikh et al. |
| 10,830,920 | B2 | 11/2020 | Parikh et al. |
| 11,099,294 | B2 | 8/2021 | Parikh et al. |
| 11,182,637 | B2 | 11/2021 | Akira |
| 2003/0091144 | A1 | 5/2003 | Bartle |
| 2009/0129544 | A1 | 5/2009 | Chen et al. |
| 2013/0101172 | A1 | 4/2013 | Parikh et al. |
| 2013/0156156 | A1* | 6/2013 | Roe ........................ G01V 5/223 |
| | | | 378/57 |
| 2013/0315464 | A1 | 11/2013 | Hurd et al. |
| 2016/0097877 | A1 | 4/2016 | Parikh et al. |
| 2017/0299765 | A1 | 10/2017 | Parikh et al. |
| 2017/0329036 | A1* | 11/2017 | Morton .................. G01V 5/224 |
| 2019/0162873 | A1 | 5/2019 | Parikh et al. |
| 2020/0073008 | A1 | 3/2020 | Parikh et al. |
| 2020/0073009 | A1 | 3/2020 | Parikh et al. |
| 2021/0042561 | A1 | 2/2021 | Akira |
| 2021/0405243 | A1 | 12/2021 | Parikh et al. |
| 2022/0187222 | A1 | 6/2022 | Lee et al. |
| 2025/0094380 | A1* | 3/2025 | Mazed ................... G01S 17/08 |

FOREIGN PATENT DOCUMENTS

| | | |
|---|---|---|
| KR | 10-1893557 B1 | 8/2018 |
| KR | 10-2019-0044698 A | 4/2019 |
| KR | 10-1995294 B1 | 7/2019 |
| KR | 10-2187572 B1 | 12/2020 |
| KR | 10-2293548 B1 | 8/2021 |
| WO | 2018/062308 A1 | 4/2018 |

OTHER PUBLICATIONS

Sanjeevarddy et al. "High Energy X-ray Imaging Technology for the Detection of Dangerous Materials in Air Freight Containers", IEEE Xplore, 2015, p. 1-6. (Year: 2015).*

International Search Report issued on May 17, 2022, for corresponding International Patent Application No. PCT/KR2022/003322, along with an English translation (5 pages).

Written Opinion issued on May 17, 2022, for corresponding International Patent Application No. PCT/KR2022/003322 (3 pages).

Jan-Martin O. Steitz et al., "Multi-view X-Ray R-CNN", Advances in Databases and Information systems, Springer International Publishing, CHAM, Feb. 14, 2019, pp. 153-168, cited in NPL No. 2.

Extended European Search Report issued Jul. 16, 2024, corresponding to European Application No. 22767514.7, 7 pages.

* cited by examiner

FIG. 4

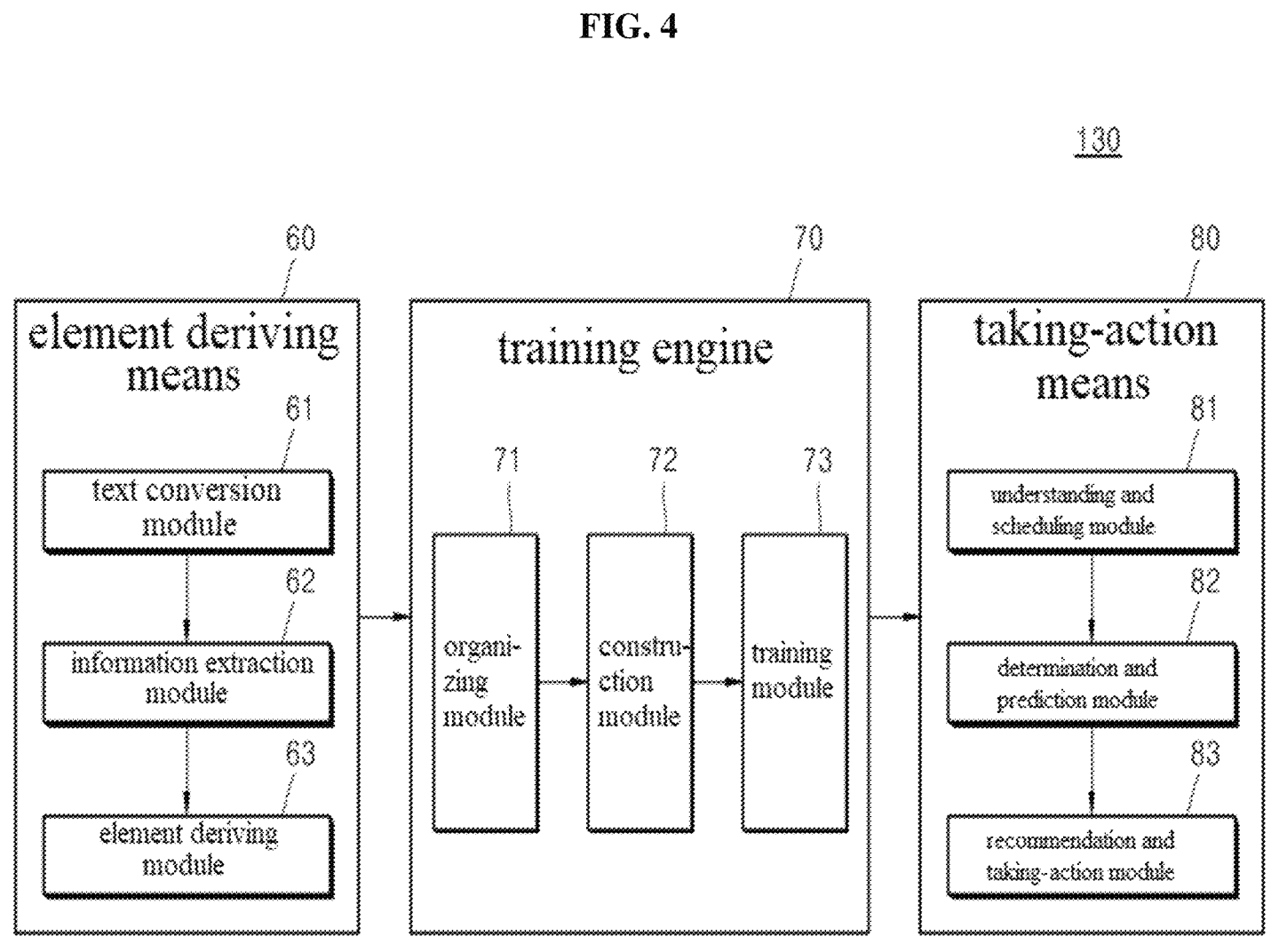

130 taking-action means 80 understanding and scheduling module 81 determination and prediction module 82 recommendation and taking-action module 83 training engine 70 organizing module 71 construction module 72 training module 73 element deriving means 60 text conversion module 61 information extraction module 62 element deriving module 63

FIG. 8

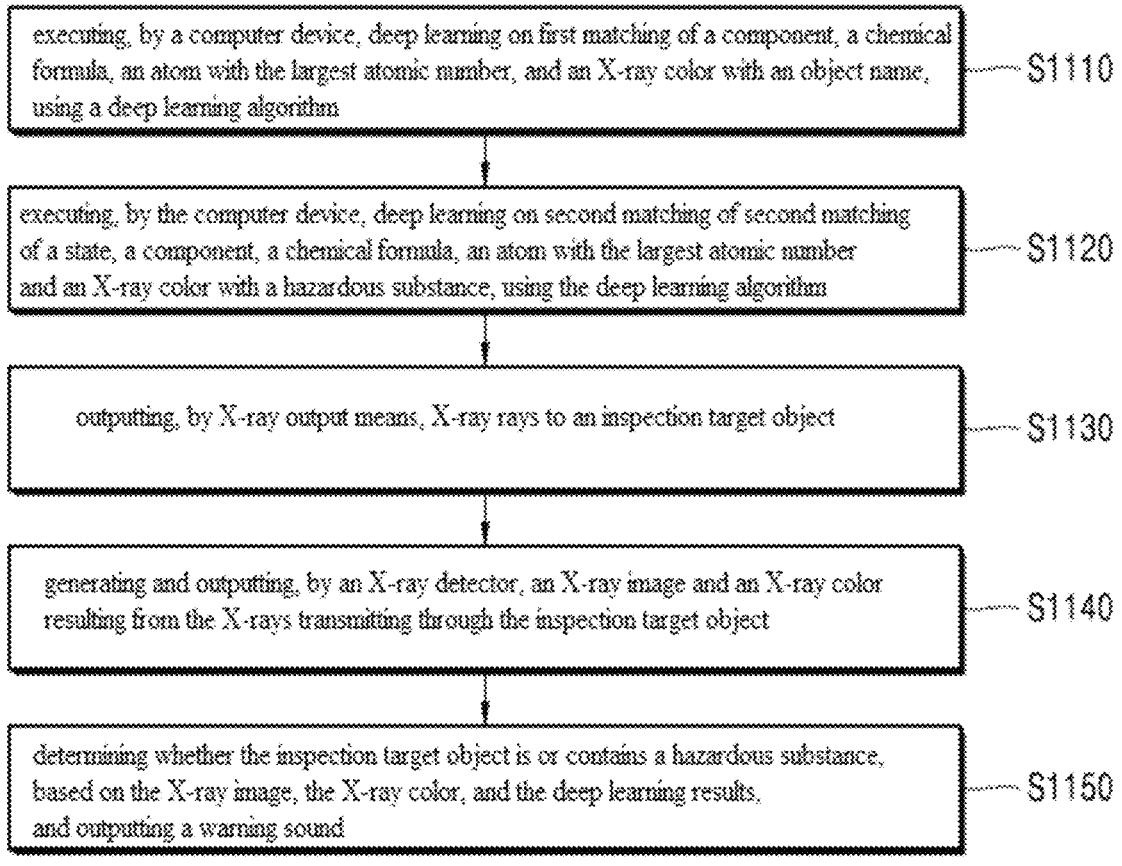

executing, by a computer device, deep learning on first matching of a component, a chemical formula, an atom with the largest atomic number, and an X-ray color with an object name, using a deep learning algorithm —— S1110 executing, by the computer device, deep learning on second matching of second matching of a state, a component, a chemical formula, an atom with the largest atomic number and an X-ray color with a hazardous substance, using the deep learning algorithm —— S1120 outputting, by X-ray output means, X-ray rays to an inspection target object —— S1130 generating and outputting, by an X-ray detector, an X-ray image and an X-ray color resulting from the X-rays transmitting through the inspection target object —— S1140 determining whether the inspection target object is or contains a hazardous substance, based on the X-ray image, the X-ray color, and the deep learning results, and outputting a warning sound —— S1150

SYSTEM AND METHOD FOR DETECTING DANGEROUS SUBSTANCE BY USING ARTIFICIAL INTELLIGENCE

CROSS-REFERENCE TO RELATED APPLICATION

The present application is a national stage filing under 35 U.S.C § 371 of PCT application number PCT/KR2022/003322 filed on Mar. 8, 2022, which is based on and claims priority to Korean Patent Application No. 10-2021-0031911 filed on Mar. 11, 2021, in the Korean Intellectual Property Office. The aforementioned applications are incorporated herein by reference in their entirety.

TECHNICAL FIELD

The present disclosure relates to system and method for detecting dangerous substance by using artificial intelligence. More specifically, the present disclosure relates to a hazardous substance detection system and method using artificial intelligence in which X-ray from an X-ray apparatus is irradiated to an inspection target object, and the object is identified based on a property that a color of the X-ray transmitting through the object corresponds to an atom having the largest atomic number in the periodic table among atoms constituting the object, and thus the system and the method perform deep learning on the X-ray color of each of hazardous substances, and compares the X-ray color of each of hazardous substances with the X-ray color of the object, thereby rapidly detecting the hazardous substance at airports, ports, military bases, event halls, stadiums, exhibition halls, performance halls, government buildings, and VIP guard places.

BACKGROUND

In general, a security search device detects a hazardous substance using image information obtained from the X-ray ray transmitting through the object. The object passes through the security search device such that an image thereof is obtained. The image is displayed on a screen. A search agent may determine whether the object is hazardous.

An early X-Ray apparatus uses a method of projecting the X-Ray onto an object and then specifying a brightness of an image based on an amount of the X-ray detected by an X-ray detector, and generating an X-Ray image based on the brightness. However, since a black-based and white image displayed in the X-Ray apparatus only has brightness information of the object, there is a problem in that readability of the image is lowered.

In order to solve this problem, a method of reading an organic material and an inorganic material is used based on a comparing result of colors based on transmittances of X-rays emitted at different angles.

However, in the method of reading the organic and inorganic materials, a criterion for color determination is ambiguous. Further, there is a limit to accurate reading because variation in reading ability is large according to the reader's experience. This increases the reader's fatigue.

Therefore, there is a need for a technique to accurately determine whether the object is hazardous based on an identification result of an atom that constitutes the object regardless of the variation in the reader's experience.

DESCRIPTION OF RELATED ART

Technical Issues

A purpose of the present disclosure is to provide a hazardous substance detection system and method using artificial intelligence in which X-ray from an X-ray apparatus is irradiated to an inspection target object, and the object is identified based on a property that a color of the X-ray transmitting through the object corresponds to an atom having the largest atomic number in the periodic table among atoms constituting the object, and thus the system and the method perform deep learning on the X-ray color of each of hazardous substances, and compares the X-ray color of each of hazardous substances with the X-ray color of the object, thereby rapidly detecting the hazardous substance at airports, ports, military bases, event halls, stadiums, exhibition halls, performance halls, government buildings, and VIP guard places.

Technical Solution

A first aspect of the present disclosure provides a hazardous substance detection system using artificial intelligence, the system comprising: X-ray output means for outputting X-ray rays to an inspection target object; an X-ray detector configured to generate and output an X-ray image and an X-ray color resulting from the X-rays transmitting through the inspection target object; database configured to store therein first matching of a component, a chemical formula, an atom with the largest atomic number, and an X-ray color with an object name, and second matching of a state, a component, a chemical formula, an atom with the largest atomic number and an X-ray color with a hazardous substance; and a computer device electrically connected to the X-ray detector, wherein the computer device is configured to: execute deep learning on each of the first and second matchings using a deep learning algorithm; and determine whether the inspection target object is or contains a hazardous substance, based on the X-ray image, the X-ray color, and the deep learning results.

In one implementation of the hazardous substance detection system, the atom having the largest atomic number among atoms constituting each of an object of the object name and the hazardous substance is defined as a representative atom, wherein the database is configured to store therein: a first correspondence between a first group and first color data, wherein in the first group, the representative atom has the atomic number in a range of atomic numbers 1 to 10 in the periodic table; a second correspondence between a second group and second color data, wherein in the second group, the representative atom has the atomic number in a range of atomic numbers 12 to 18 in the periodic table; a third correspondence between a third group and third color data, wherein in the third group, the representative atom has the atomic number in a range of atomic numbers 20 to 40 in the periodic table; and a fourth correspondence between a fourth group and fourth color data, wherein in the fourth group, the representative atom has the atomic number in a range of atomic numbers 42 to 118 in the periodic table.

In one implementation of the hazardous substance detection system, the X-ray detector is configured to display, as the X-ray color: the first color data when the inspection target object belongs to the first group; the second color data when the inspection target object belongs to the second group; the third color data when the inspection target object belongs to the third group; and the fourth color data when the inspection target object belongs to the fourth group.

In one implementation of the hazardous substance detection system, the first color data includes an orange-based color, the second color data includes a green-based color, the third color data includes a blue-based color, and the fourth color data includes a black-based color.

In one implementation of the hazardous substance detection system, the inspection target object is a glass bottle containing nitromethane therein, wherein the X-ray output means outputs the X-rays to the glass bottle, wherein the X-ray detector generates an X-ray image including a shape of the glass bottle and outputs the X-ray color, wherein the X-ray color includes: a green color corresponding to an atom (Si) having the largest atomic number among atoms constituting the glass bottle; and an orange color corresponding to an atom (O) having the largest atomic number among atoms constituting nitromethane ($CH_3NO_2$) received in the glass bottle, wherein the computer device is configured to: determine that the inspection target object is the glass bottle based on the X-ray image, based on the deep learning results; determine that the inspection target object contains the hazardous substance based on the X-ray color including the orange color; and output a warning message and/or a warning sound.

In one implementation of the hazardous substance detection system, the inspection target object is a glass bottle containing a radioactive substance therein, wherein the X-ray output means outputs the X-rays to the glass bottle, wherein the X-ray detector generates an X-ray image including a shape of the glass bottle and outputs the X-ray color, wherein the X-ray color includes: a green color corresponding to an atom (Si) having the largest atomic number among atoms constituting the glass bottle; and a black color corresponding to an atom having the largest atomic number among atoms constituting the radioactive substance received in the glass bottle, wherein the computer device is configured to: determine that the inspection target object is the glass bottle based on the X-ray image, based on the deep learning results; determine that the inspection target object contains the hazardous substance based on the X-ray color including the black color; and output a warning message and/or a warning sound.

A second aspect of the present disclosure provides a hazardous substance detection method using artificial intelligence based on first matching of a component, a chemical formula, an atom with the largest atomic number, and an X-ray color with an object name, and second matching of a state, a component, a chemical formula, an atom with the largest atomic number and an X-ray color with a hazardous substance, wherein the method comprises: (a) executing, by a computer device, deep learning on the first matching using a deep learning algorithm; (b) executing, by the computer device, deep learning on the second matching using the deep learning algorithm; (c) outputting, by X-ray output means, X-ray rays to an inspection target object; (d) generating and outputting, by an X-ray detector, an X-ray image and an X-ray color resulting from the X-rays transmitting through the inspection target object; and (e) determining whether the inspection target object is or contains a hazardous substance, based on the X-ray image, the X-ray color, and the deep learning results.

In one implementation of the hazardous substance detection method, the atom having the largest atomic number among atoms constituting each of an object of the object name and the hazardous substance is defined as a representative atom, wherein in a first group, the representative atom has the atomic number in a range of atomic numbers 1 to 10 in the periodic table; wherein in a second group, the representative atom has the atomic number in a range of atomic numbers 12 to 18 in the periodic table; wherein in a third group, the representative atom has the atomic number in a range of atomic numbers 20 to 40 in the periodic table; and wherein in a fourth group, the representative atom has the atomic number in a range of atomic numbers 42 to 118 in the periodic table, wherein in the (d), the X-ray detector displays, as the X-ray color: first color data when the inspection target object belongs to the first group; second color data when the inspection target object belongs to the second group; third color data when the inspection target object belongs to the third group; and fourth color data when the inspection target object belongs to the fourth group.

In one implementation of the hazardous substance detection method, the first color data includes an orange-based color, the second color data includes a green-based color, the third color data includes a blue-based color, and the fourth color data includes a black-based color.

In one implementation of the hazardous substance detection method, in the (c), the X-ray output means outputs the X-rays to a glass bottle as the inspection target object, wherein in the (d), the X-ray detector generates an X-ray image including a shape of the glass bottle and outputs the X-ray color, wherein the X-ray color includes: a green color corresponding to an atom (Si) having the largest atomic number among atoms constituting the glass bottle; and an orange or black color corresponding to an atom having the largest atomic number among atoms constituting a substance received in the glass bottle, wherein the (e) includes: determining that the inspection target object is the glass bottle based on the X-ray image, based on the deep learning results; determining that the inspection target object contains the hazardous substance based on the X-ray color including the orange or black color; and outputting a warning message and/or a warning sound.

Technical Effect

In the hazardous substance detection system and method using artificial intelligence according to the present disclosure, X-ray from an X-ray apparatus is irradiated to an inspection target object, and the object is identified based on a property that a color of the X-ray transmitting through the object corresponds to an atom having the largest atomic number in the periodic table among atoms constituting the object, and thus the system and the method perform deep learning on the X-ray color of each of hazardous substances and compares the X-ray color of each of hazardous substances with the X-ray color of the object, thereby rapidly detecting the hazardous substance at airports, ports, military bases, event halls, stadiums, exhibition halls, performance halls, government buildings, and VIP guard places.

In addition, when using the hazardous substance detection system and method using artificial intelligence according to the present disclosure, the variation in the reading ability of the X-ray apparatus which is dependent on the reader's experience may be narrowed so that the national institution may block introduction of hazardous substances in advance. Thus, the hazardous substance detection system and method may play an important role in ensuring the safety and livelihood of citizens, and ultimately achieving national stability.

As a result, the hazardous substance detection system and method using artificial intelligence according to the present disclosure may determine what group in the periodic table the atom with the largest atomic number, that is, the heaviest atom among the atoms constituting the object belongs to, regardless of the density, thickness, and transmittance of the object, and may determine whether the object is hazardous based on the determination result. Thus, the hazardous substance detection system and method using artificial intelligence according to the present disclosure may be achieve more accurate reading of the object, compared to the existing method of reading the organic and inorganic materials using the color of the image of the X-ray apparatus.

BRIEF DESCRIPTION OF DRAWINGS

FIG. 4 is a configuration diagram showing functional blocks of an artificial intelligence unit according to an embodiment of the present disclosure.

FIG. 8 is a diagram showing an operation flowchart for illustrating a hazardous substance detection method using artificial intelligence according to an embodiment of the present disclosure.

DETAILED DESCRIPTIONS

Figure 1:
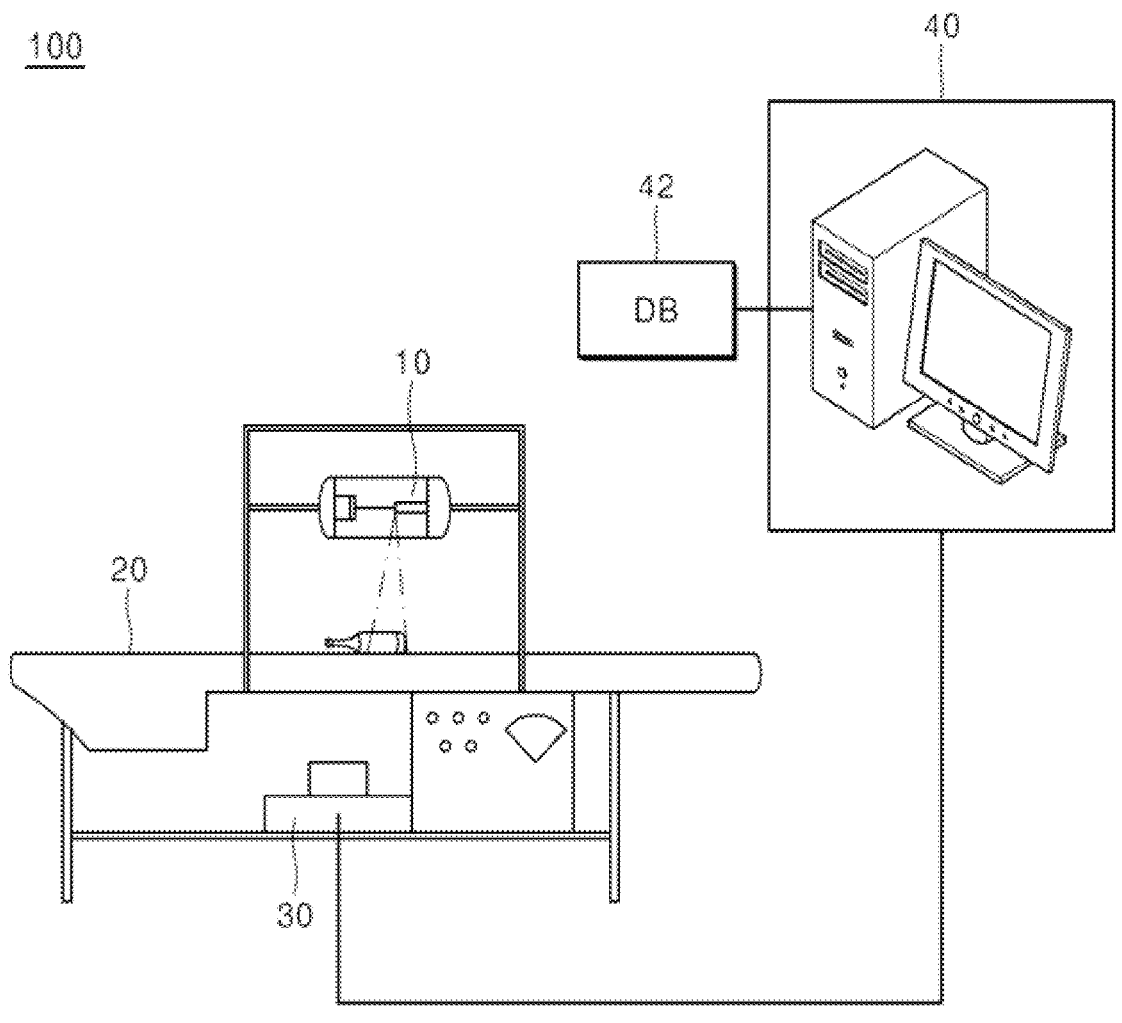
FIG. 1 is a configuration diagram schematically showing an overall configuration of a hazardous substance detection system using artificial intelligence according to an embodiment of the present disclosure.

Advantages and features of the present disclosure, and how to achieve them will become apparent with reference to the embodiments described below in detail in conjunction with the accompanying drawings. However, the present disclosure is not limited to the embodiments as disclosed below, but will be implemented in a variety of different forms. Only these embodiments make the present disclosure complete, and are constructed to fully inform those having common knowledge in the technical field to which the present disclosure belongs of a scope of the disclosure. The scope of the present disclosure is only defined by the scope of the claims. For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

A shape, a size, a ratio, an angle, a number, etc. disclosed in the drawings for illustrating embodiments of the present disclosure are exemplary, and the present disclosure is not limited thereto. The same reference numerals refer to the same elements herein. In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter. Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented for example, rotated 90 degrees or at other orientations, and the spatially relative descriptors used herein should be interpreted accordingly.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a hazardous substance detection system and method using artificial intelligence according to a preferred embodiment of the present disclosure will be described in detail with reference to the accompanying drawings.

A study on the present disclosure begins based on the reason why colors are rendered in a different manner depending on a type of chemical substance as a raw material, in the X-ray reading experiment process of explosives. Thus, the present disclosure has been completed by achieving a method of identifying which group in the periodic table an atom with the largest atomic number among atoms constituting the object belongs to.

As used herein, the term "object" (more strictly, a substance constituting the object) refers to a target object subjected to X-ray inspection, and may be present in a gas, liquid, and/or solid state, and may be made of a compound or mixture having a mass. Furthermore, the object has a molecular unit, and may include prohibited items such as firearms, weapons, firearms, explosives, flammable objects, toxic objects, narcotics, and disposable gas lighters prohibited in airports, ports, military bases, event halls, stadiums, exhibition halls, performance halls, government buildings, and VIP guard places.

FIG. 1 is a configuration diagram schematically showing an overall configuration of a hazardous substance detection system using artificial intelligence according to an embodiment of the present disclosure.

Referring to FIG. 1, a hazardous substance detection system 100 using artificial intelligence according to an embodiment of the present disclosure may include X-ray output means 10, a conveyor belt 20, an X-ray detector 30, a computer device 40 and database DB, 42.

The X-ray output means 10 outputs X-ray rays to the inspection target object.

The conveyor belt 20 serves to transfer the inspection target object to the X-ray output means 10.

The X-ray detector 30 generates X-ray images based on X-rays passing through the inspection target object and outputs X-ray colors of the images. The X-ray detector 30 refers to an X-ray apparatus that displays a four-colors image. When the detector 30 inspects the object containing a molecular unit, the detector 30 displays a color of a group including an atom with the largest atomic number among the atoms contained in the object.

The database 42 stores therein first matching of a component, a chemical formula, an atom with the largest atomic number, and an X-ray color with an object name, and stores therein second matching of a state, a component, a chemical formula, an atom with the largest atomic number and an X-ray color with a hazardous substance.

The computer device 40 executes deep learning using a deep learning algorithm based on the first matching of a component, a chemical formula, an atom with the largest atomic number, and an X-ray color with an object name, and executes deep learning using a deep learning algorithm based on the second matching of a state, a component, a chemical formula, an atom with the largest atomic number and an X-ray color with a hazardous substance. Then, the computer device 40 detects the hazardous substance based on the deep learning results, the X-ray image, and the X-ray color output from the X-ray detector 30.

The computer device 40 is electrically connected to the X-ray detector 30, and recognizes the X-ray image and the X-ray color output from the X-ray detector 30. Thus, the computer device 40 is configured to determine what group in the periodic table the atom with the largest atomic number, that is, the heaviest atom among the atoms constituting the object belongs to, based on the X-ray color. More specifically, the computer device 40 is configured to determine which group among first to fourth groups the atom with the largest atomic number, that is, the heaviest atom among the atoms constituting the object belongs to, based on the X-ray color.

Further, when the atom with the largest atomic number in atoms constituting each of the object of the object name and the hazardous substance belongs to the first group including atoms with atomic numbers 1 to 10 of the periodic table, the first group corresponds to first color data as shown in Table 1 and thus the first corresponding relationship is stored in the database 42. Further, when the atom with the largest atomic number in atoms constituting each of the object of the object name and the hazardous substance belongs to the second group including atoms with atomic numbers 12 to 18 of the periodic table, the first group corresponds to second color data as shown in Table 1 and thus the second corresponding relationship is stored in the database 42. Further, when the atom with the largest atomic number in atoms constituting each of the object of the object name and the hazardous substance belongs to the third group including atoms with atomic numbers 20 to 40 of the periodic table, the third group corresponds to third color data as shown in Table 1 and thus the third corresponding relationship is stored in the database 42. Further, when the atom with the largest atomic number in atoms constituting each of the object of the object name and the hazardous substance belongs to the fourth group including atoms with atomic numbers 42 or larger of the periodic table, the fourth group corresponds to fourth color data as shown in Table 1 and thus the fourth corresponding relationship is stored in the database 42.

The first color data may include an orange-based color, the second color data may include a green-based color, the third color data may include a blue-based color, and the fourth color data may include a black-based color.

A following Table 1 shows the four colors corresponding to the four groups including the atoms having the largest atomic numbers in atoms constituting the inspection target object according to an embodiment of the present disclosure.

TABLE 1

| Atomic number | Group | Color data | Color | Elements |
|---|---|---|---|---|
| 1 to 10 | First | First | Orange | Hydrogen (1) to Neon (10) |
| 12 to 18 | Second | Second | Green | Magnesium (12) to Argon (18) |

TABLE 1-continued

| Atomic number | Group | Color data | Color | Elements |
| --- | --- | --- | --- | --- |
| 20 to 40 | Third | Third | Blue | Calcium (20) to Zirconium (40) |
| 42 to 118 | Fourth | Fourth | Black | Molybdenum (42) to Oganesson (118) |

In Table 1, at each of the atomic number 11 sodium (Na), atomic number 19 potassium (K), and atomic number 41 niobium (Nb), adjacent ones of the four colors transition to each other. Thus, each of the atomic number 11 sodium (Na), atomic number 19 potassium (K), and atomic number 41 niobium (Nb) has a unique color and thus is excluded from the table 1. The atomic number 11 sodium (Na), atomic number 19 potassium (K), and atomic number 41 niobium (Nb) have orange, green, and blue colors, respectively.

When each of the atomic number 11 sodium (Na), atomic number 19 potassium (K), and atomic number 41 niobium (Nb) binds to other atoms to form a compound or mixture, each of the atomic number 11 sodium (Na), atomic number 19 potassium (K), and atomic number 41 niobium (Nb) does not affect color determination when reading the X-rays.

In addition, in Table 1, Lanthanide includes No. 57 lanthanum (La), No. 58 cerium (Ce), No. 59 praseodymium (Pr), No. 60 neodymium (Nd), No. 61 promethium (Pm), No. 62 samarium (Sm), No. 63 Europium (Eu), Gadolinium No. 64 (Gd), Terbium No. 65 (Tb), Dysprosium No. 66 (Dy), Holmium No. 67 (Ho), Erbium No. 68 (Er), Thulium No. 69 (Tm), Ytterbium No. 70 (Yb), and No. 71 Lutetium (Lu).

In addition, in Table 1, Actinide includes No. 89 actinium (Ac), No. 90 thorium (Th), No. 91 protactinium (Pa), No. 92 uranium (U), No. 93 neptunium (Np), No. 94 Plutonium (Pu), No. 95 Americium (Am), No. 96 Curium (Cm), No. 97 Berkelium (Bk), No. 98 Californium (Cf), No. 99 Einsteinium (Es), No. 100 fermium (Fm), No. 101 Mendelevium (Md), No. 102 Nobelium (No), and No. 103 Lawrencium (Lr).

The X-ray detector 30 displays, as the X-ray color, the first color data corresponding to the first group including atoms of atomic numbers 1 to 10 of the periodic table. The X-ray detector 30 displays, as the X-ray color, the second color data corresponding to the second group including atoms of atomic numbers 12 to 18 of the periodic table. The X-ray detector 30 displays, as the X-ray color, the third color data corresponding to the third group including atoms of atomic numbers 20 to 40 of the periodic table. The X-ray detector 30 displays, as the X-ray color, the fourth color data corresponding to the fourth group including atoms of atomic numbers 42 or greater of the periodic table.

In general, the X-ray device generates high-voltage (high-speed electrons), such that electrons (−) are bounced off a negative electrode (tungsten filament) and collide with a positive electrode (+). In this regard, whenever the high-speed electrons collide with the positive electrode, high heat and energy including X-rays are generated. Because X-rays have high energy, the X-rays have strong fluorescence action on the material of the object, and may easily pass through the object, and ionize the material.

The transmittance of X-rays varies according to the density and atomic number of the material of the object. Thus, the amount of X-rays detected by the X-ray detector 30 varies according to the transmittance. For example, in a two-color X-ray rendering a black-based-and-white image, a portion of the object having higher transmittance of the X-ray is displayed in a black color, while a portion of the object having relatively low transmittance thereof is displayed in a white color.

The X-ray apparatus displaying a four-colors image according to the present disclosure is different from a two-color X-ray apparatus displaying the black-based-and-white image in that the X-ray apparatus displaying a four-colors image according to the present disclosure acquires a lower energy image than approximately 5 keV and a higher energy image than approximately 5 keV and linearly combines the both images with each other, and displays a color of the target object as at least one of the four colors.

Further, when the X-ray apparatus that displays the four-color image uses two sources or adjusts one source to generate X-rays of low energy and X-rays of high energy alternately, the color of the object to be inspected may be displayed as at least one color of the four colors.

The X-ray apparatus displaying the four-color image in accordance with the present disclosure may include HI-SCAN 5030i, HI-SCAN 7555i, HI-SCAN 100100V-2 is, HI-SCAN 6040-2 is HR, HI-SCAN 7555aTiX, and HI-SCAN 6040aX from Smith Detection, XR3D from Vorti Detection, and EI-5030C from East Image.

In accordance with the present disclosure, it is identified based on a result of inspecting atoms with an X-ray apparatus displaying the four-color image that the displayed color varies based on the atomic number.

Atoms are inspected in a following manner using the X-ray apparatus displaying the four-color image. A test target atom is a pure single atom with higher than 97.0% purity without impurities. For example, the test target atom may include boron, carbon, or magnesium available from Sigma-Aldrich.

First, the test target atoms are placed on a plastic-based disposable weighing dish [8 cm vertical side, 8 cm horizontal side, 2 cm depth; polystyrene material]. Although a variation in a weight occurs depending on a type of an atom, a weight of the single atoms is about 105 g.

Then, the dish containing the atoms therein is placed on the conveyor belt 20 passing through the inside of the X-ray apparatus (Smith detection, Hi-scan 5030i).

X-rays are emitted from the X-ray output means 10 under the collision of electric charges caused by high-voltage electricity, and the X-ray detector 30 located under the conveyor belt 20 detects the X-ray image resulting from the X-rays transmitting through the atoms and transmits the detected image to the computer device 40.

In this regard, a distance from a surface of the dish or the atoms accommodated in the dish to a tube of the X-ray apparatus displaying the four-color image may be approximately to a value in a range of 10 to 30 cm. Preferably, the distance may be adjusted to a value in a range of 20 to 30 cm. When the distance is smaller than 10 cm, it may be difficult to focus the test target object. Conversely, when the distance exceeds 30 cm, it may be difficult to read the material of the object because the distance between the test target object and the tube is too large.

When the atoms are in a liquid state, the atoms may be contained in a container that is sold in consideration of harmfulness to the human body and may be inspected while being received therein. A final color of the atom is derived based on the material constituting the container containing the liquid therein. For example, in the X-ray image, the glass as the material of the container may be displayed in a green color. The plastic as the material of the container may be displayed in an orange color.

Even when the atoms are in a gas state, the atoms may be contained in a commercially available container and may be inspected while being received therein.

In this way, the color displayed based on the atomic number was identified based on a result of directly imaging the test target atom in a state of being contained in the commercially available container.

EXAMPLES

Figure 2:
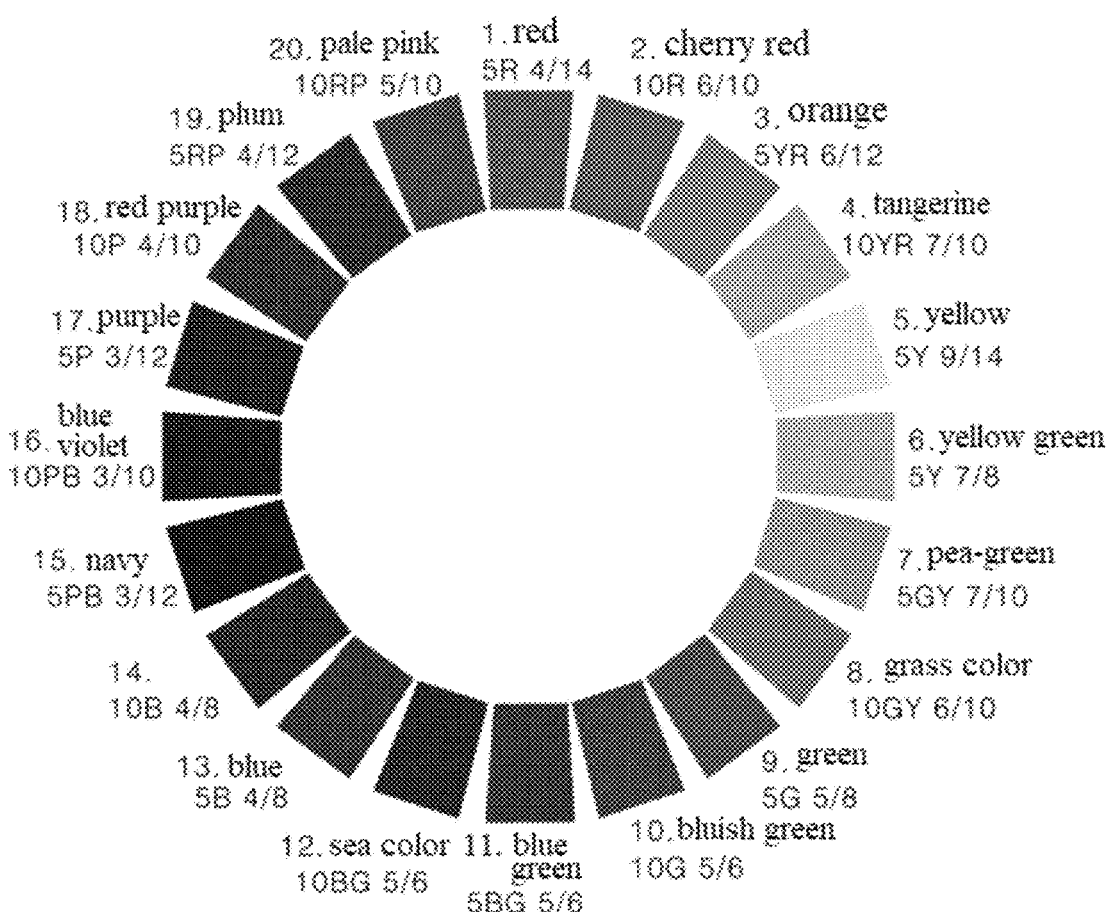
FIG. 2 is a Munsell's 20-color circle for distinguishing a 4-colors image according to the present disclosure.

FIG. 2 is a Munsell's 20-color circle for distinguishing a 4-color image according to the present disclosure.

stance, as shown in Table 3. Table 2 shows the first matching of a component, a chemical formula, an atom with the largest atomic number, and an X-ray color with an object name on which the computer device according to an embodiment of the present disclosure performs deep learning. Table 3 shows the second matching of a state, a component, a chemical formula, an atom with the largest atomic number and an X-ray color with a hazardous substance on which the computer device according to an embodiment of the present disclosure performs deep learning.

TABLE 2

| Object name | Components | Chemical formula | Atom having the largest atomic number | X-ray color |
|---|---|---|---|---|
| Glass bottle | Silicic anhydride, boric anhydride, phosphoric anhydride, etc. Sodium, potassium, calcium, barium, etc. lead, aluminum, etc. | $SiO_2$ | 14. silicon (Si) | Green |
| Plastic bottle | Polyethylene terephthalate (PET) | $(C_{10}H_8O_4)n$ | | Orange |
| Tumbler | Iron | | 26. Iron (Fe) | Blue |
| Water | Water | $H_2O$ | 8. Oxygen (O) | Orange |
| Carbon dioxide gas | Carbon dioxide | $CO_2$ | 8. Oxygen (O) | Orange |
| Butane gas | Butane | $C_4H_{10}$ | 6. Carbon (C) | Orange |
| Flour | Starch $(C_6H_{10}O_5) \bullet (H_2O)$, gluten | | 8. Oxygen (O) | Orange |
| Nitric acid gas | Nitric acid | $HNO_3$ | 8. Oxygen (O) | Orange |
| Sulfuric acid gas | Sulfur | $H_2SO_4$ | 16. Sulfur (S) | Green |
| Ammonium nitrate gas | Ammonium nitrate | $NH_4NO_3$ | 8. Oxygen (O) | Orange |
| Salt | Sodium chloride | NaCl | 17. Chlorine (Cl) | Green |

In FIG. 2, the orange-based color, green-based color, blue-based color, and black-based color included in the four-color image are distinguished from each other based on the Munsell's 20-color circle.

The color circle is an arrangement of colors obtained by connecting the spectrum of visible light in a ring shape. Twenty colors are displayed based on HV/C (hue, brightness/saturation) as the principle of color expression.

In the Munsell's 20 color circle, 1. Red represents R primary color, 5. Yellow represents Y primary color, 9. Green represents G primary color, 13. Blue represents B primary color, and 17. Purple represents P primary color.

Specifically, as indicated in the Munsell's 20-color circle, a range from 1. red to 5. yellow belongs to the orange-based color; a range from 6. yellow-green to 12. sea belongs to the green-based color; a range from 13. Blue to 18. red-violet belongs to the blue-based color, and a completely black color belongs to the black-based color.

Figure 3:
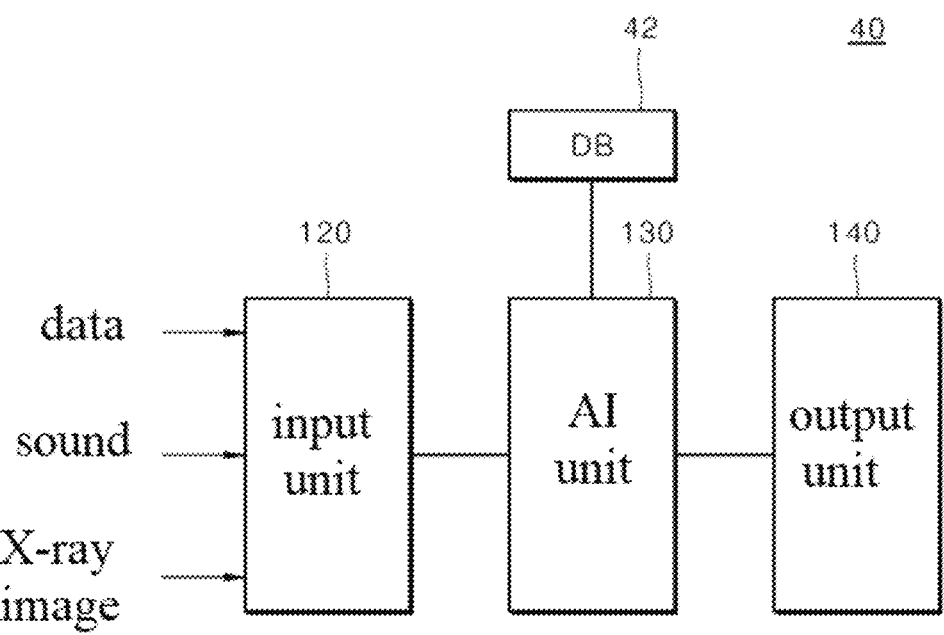
FIG. 3 is a configuration diagram schematically showing an internal configuration of a computer device according to an embodiment of the present disclosure.

FIG. 3 is a configuration diagram schematically showing an internal configuration of a computer device according to an embodiment of the present disclosure.

Referring to FIG. 3, the computer device 40 according to an embodiment of the present disclosure may include the database DB 42, an input unit 120, an artificial intelligence unit 130 and an output unit 140.

The database 42 stores therein first matching of a component, a chemical formula, an atom with the largest atomic number, and an X-ray color with an object name as shown in Table 2, and stores therein second matching of a state, a component, a chemical formula, an atom with the largest atomic number and an X-ray color with a hazardous sub-

TABLE 3

| Hazardous substance | Component | X-ray color |
|---|---|---|
| VX agent (nerve agent) | $C_{11}H_{26}NO_2PS$ | Green |
| Radioactive substance | | Black |
| Glyphosate (glycine) | $C_3H_8NO_5P$ | Green |
| Chloramben | $C_7H_5Cl_2NO_2$ | Green |
| Nitromethane | $CH_3NO_2$ | Orange |
| Methyl nitrate | $C_3H_7N_3O_5$ | Orange |
| Triacetonetriperoxide (TATP) | $C_9H_{18}O_6$ | Orange |
| Nitroglycol | $C_2H_4N_2O_6$ | Orange |
| Ammonium nitrate | NH4NO3 | Orange |
| Nitrocellulose | $C_6H_7(NO_2)_3O_5$ | Orange |
| Nitroglycerin | $C_6H5(NO3)_3$ | Orange |
| Pentaerythritol tetranitrate (PETN) | $C_5H_8N_4O_{12}$ | Orange |
| HMX | $C_4H_8N_8O_8$ | Orange |
| TNT | $C_7H_5N_3O_6$ | Orange |
| RDX | $(O_2NNCH_2)_3$ | Orange |

For example, in the database 42, when the object name is a plastic bottle, the object component matches polyethylene terephthalate PET, the chemical formula matches $(C_{10}H_8O_4)_n$, and the atom with the largest atomic number matches atomic number 8 Oxygen (O), and the orange matches the X-ray color, as shown in Table 2, Further, in the database 42, when the hazardous substance is nitromethane, $CH_3NO_2$ matches the component, and the orange matches the X-ray color as shown in Table 3.

The input unit 120 receives a shape (image), the X-ray color, sound, data, etc. from the X-ray detector 30 that is electrically connected thereto.

The artificial intelligence unit 130 executes deep learning using a deep learning algorithm based on the first matching of a component, a chemical formula, an atom with the largest atomic number, and an X-ray color with an object name, and executes deep learning using a deep learning algorithm based on the second matching of a state, a component, a chemical formula, an atom with the largest atomic number and an X-ray color with a hazardous substance. Then, the artificial intelligence unit 130 detects the hazardous substance based on the deep learning results, the X-ray image, and the X-ray color output from the X-ray detector 30.

The output unit 140 may identify the X-ray image and the X-ray color input from the X-ray detector 30 and output a warning message and a warning sound using voice or a screen when the target object is a hazardous substance.

FIG. 4 is a configuration diagram showing functional blocks of the artificial intelligence unit according to an embodiment of the present disclosure.

Referring to FIG. 4, the artificial intelligence unit 130 according to an embodiment of the present disclosure may include element deriving means 60, a training engine 70 and taking-action means 80.

That is, in accordance with the present disclosure, structured data and unstructured data are processed in the element deriving means 60 to derive elements. The training engine 70 performs self-adaptive training using the elements. Based on the training result, the taking-action means 80 performs situation understanding and scheduling, decision making and prediction, recommendation and taking-action, etc. In this way, the artificial intelligence unit 130 may be provided in a module manner, and may be suitable for various situations in the customized manner.

The element deriving means 60 may process input data to derive elements. That is, the element deriving means 60 may derive the element as the input information to the training engine 70 from the input data including structured data and unstructured data. The element deriving means 60 may be configured to include a text conversion module 61, an information extraction module 62 and an element deriving module 63.

The text conversion module 61 may convert unstructured data except a text in the input data into text data (Text conversion). In particular, the text conversion module 61 may convert unstructured data including an image and a voice except for the text into the text data.

The information extraction module 62 may extract information from the text data received from the text conversion module 61 (Information Extraction). Further, the information extraction module 62 may extract necessary information from the input data in a text format which is not a conversion target of the text conversion module 61.

The element deriving module 63 may derive the elements to be input to the training engine 70 from the extracted information (Element Identification & Elicitation).

The training engine 70 self-organizes DNA mission using the elements derived from the element deriving means 10, and self-constructs the deep learning-based artificial neural network DNA model using the self-organized DNA mission, and trains the self-constructed DNA model. In accordance with the present disclosure, self-adaptation technology and deep learning-based training technology may be combined with each other. Thus, the system and the method according to the present disclosure includes the training engine 70 that self-organizes the DNA mission and self-constructs the DNA model. The training engine 70 may effectively implement the human brain mechanism to understand the situation, and understand the mission, and create the model and solve the situation. As shown in FIG. 4, the training engine

70 may be configured to include an organizing module 71, a construction module 72 and a training module 73.

The organizing module 71 may perform self-organization of the DNA mission based on each group using the elements derived from the element deriving means 60. More specifically, the organizing module 71 may compare and evaluate the elements input over time with elements within the mission of the organization based on each group as predefined and organize and generate the DNA mission that changes over time. In this regard, the mission is a mission of an organization as predefined, and is different from the DNA mission as the mission organized by the organizing module 71 according to the present disclosure.

In one example, the DNA mission based on each group organized by the organizing module 71 may be a combination of blocks and chains of the organization based on each group. In other words, the organizing module 71 may combine the chains and the blocks of the organization with each other using the Neuroblockchain Combination technology to organize the DNA mission. Further, according to an embodiment, the DNA mission may include a special DNA mission composed of a combination of the chains.

Further, the DNA mission may be composed of a sum of mission modules, and the mission module may be a function of the element received from the element deriving means 60 and a position of an organization member. In this regard, the position of the organization member may be pre-determined.

In accordance with the present disclosure, in order for the implemented artificial intelligence unit 130 to support the human mission, a position (guidance) of the atom with the largest atomic number among the atoms constituting the object of the object name may be considered. The organization has, for example, a hierarchical tree structure or a parallel structure. In the hierarchical tree structure, there is a connection between nodes, that is, a connection (chain) between positions within a group). Thus, there is a connection (chain) between groups (guidelines in the organization) constructed in a certain tree structure (block).

When the organizing module 71 uses the neuroblockchain combination technology, the chain refers a connection between positions within a group and a connection between atoms of a component that constitutes the object of the object name. The block of the organization refers to a group in which positions are connected to each other within a certain group. One group may be composed of one block, or one group may be composed of several blocks.

Figure 5:
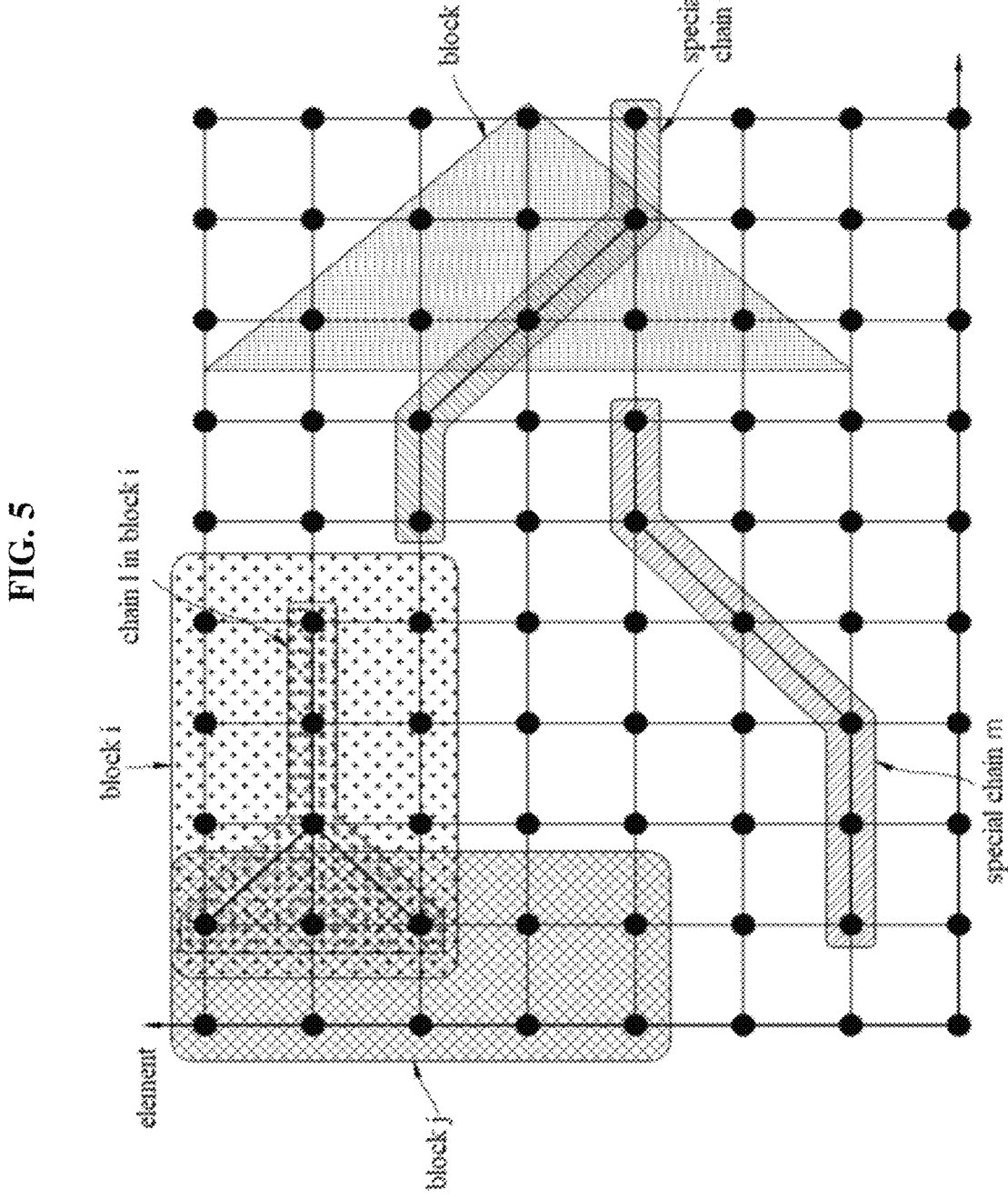
FIG. 5 is a diagram showing, by way of example, a method of self-organizing a DNA mission in a organizing module using a neuroblockchain combination according to an embodiment of the present disclosure.

FIG. 5 is a diagram showing, by way of example, a method of self-organizing a DNA mission in the organizing module using a neuroblockchain combination according to an embodiment of the present disclosure.

The organizing module 71 of the deep learning-based training engine 70 according to an embodiment of the present disclosure may combine the chains (Chain 1, Chain m, Chain n, etc.) and the blocks (Block i, Block j, Block k, etc.) of the organization with each other to construct the DNA mission. The constructed DNA mission may be represented as the components that constitute the object of the object name and a combination of the components.

Further, the DNA mission may include a special DNA missions composed of a combination of the chains. That is, according to an embodiment, the DNA mission may be composed only of a combination of chains and may be free of the block of the organization.

The construction module 72 may self-construct a deep learning-based artificial neural network DNA model using the self-organized DNA mission. In other words, the construction module 72 may receive the DNA mission from the organizing module 71 and construct the artificial neural network DNA model capable of performing the deep learning by itself. The DNA model self-constructed by the construction module 72 may be a model that flexibly changes according to the input data thereto because the model is constructed using the DNA mission self-organized based on the input elements over time.

The DNA model may be a combination of functional blocks and chains. In other words, the construction module 72 may organize the DNA model by combining the functional blocks and the chains with each other using the Blockchain Combination technology.

Further, the self-construction module 72 may self-construct the DNA model composed of a combination of functional submodels.

In this regard, the functional block refers to a set of functions for a situation that enables the artificial neural network model to perform the learning in a mimicking manner of the situation determination scheme of the human brain. The block of the single organization in the DNA mission may be composed of a single functional block in the DNA model. It may be assumed that a simple situation may be identified via a single thought, while a complex situation may be identified via multiple thoughts instead of just one thought. In a process of constructing a model to solve a mission, this assumption may be used. Thus, the DNA model may be self-organized by combining the functional blocks and the chains with each other in such a manner that the complex situation is divided into portions based on functions and the portions are grouped for determination.

Figure 6:
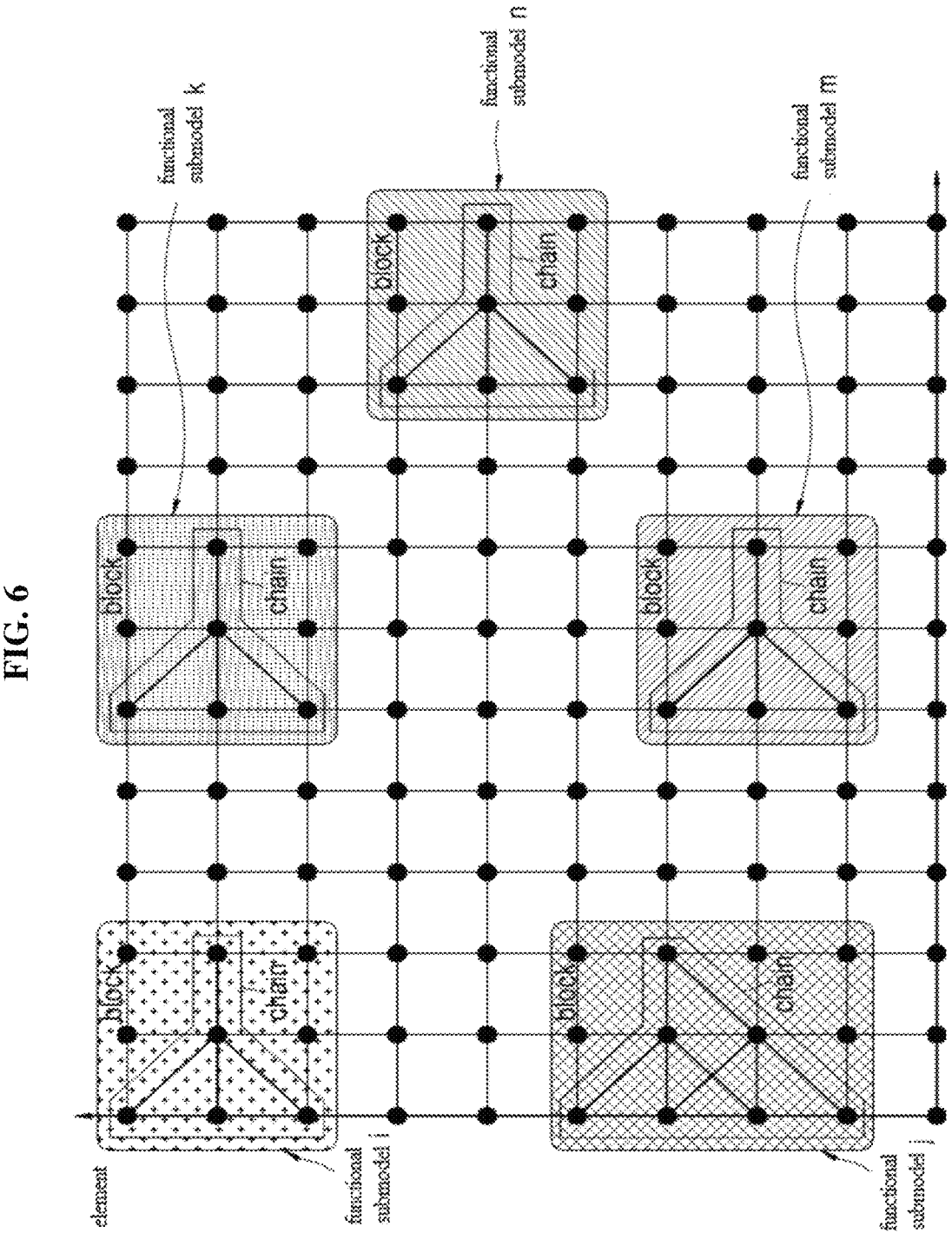
FIG. 6 is a diagram showing, by way of example, a method of self-constructing a DNA model in a construction module using a neuroblockchain combination according to an embodiment of the present disclosure.

FIG. 6 is a diagram showing, by way of example, a method of self-constructing a DNA model in a construction module using a neuroblockchain combination according to an embodiment of the present disclosure.

The construction module 72 of the deep learning-based training engine 70 according to an embodiment of the present disclosure may combine functional blocks and chains with each other using the neuroblockchain combination technology, as shown in FIG. 6 to construct functional sub-models (Functional Submodel i, Functional Submodel j, Functional Submodel k, Functional Submodel m, Functional Submodel n, etc.), and then construct the DNA model as the sum of the functional submodels.

In one example, in FIG. 4, the training module 73 may self-train the self-constructed DNA model. That is, the training module 73 may train the DNA model constructed by the construction module 72, and may train the DNA model using artificial neural network technology, and may deliver the training result to the taking-action means 80.

Figure 7:
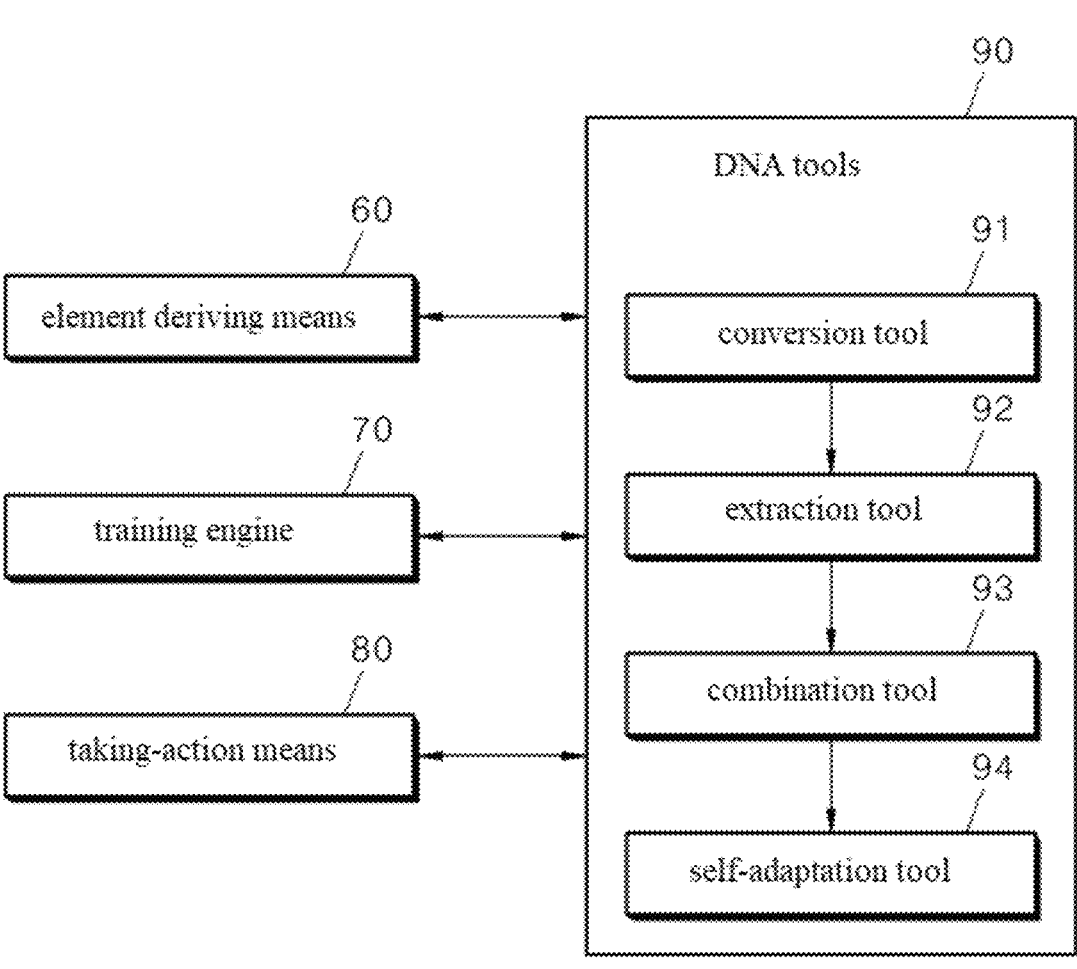
FIG. 7 is a diagram showing a configuration further including DNA tools in an artificial intelligence unit using deep learning-based self-adaptive training technology according to an embodiment of the present disclosure.

The taking-action means 80 may perform a function based on the training result of the training engine 70 using the understanding and scheduling module 81, the determination and prediction module 82, and the recommendation and taking-action module 83. As shown in FIG. 7, the taking-action means 80 may be configured to include the understanding and scheduling module 81, the determination and prediction module 82, and the recommendation and taking-action module 83. Each of the understanding and scheduling module 81, the determination and prediction module 82, and the recommendation and taking-action module 83 may be integrated into a single software. In accordance with the present disclosure, a structure of the taking-action means 80 will be described.

The understanding and scheduling module 81 may understand a given situation or grasp an intention, and provide scheduling to a decision maker based on the result of understanding the situation or understanding the intention.

The determination and prediction module 82 may provide determination and analysis results about the given situation, and may predict and provide a possible situation. For example, the determination and prediction module 82 may identify the object name based on the X-ray image input from the X-ray detector 30, and predict whether the object is or contains a hazardous substance based on the an X-ray color, and provide the prediction result.

Based on the analysis result and prediction result, the recommendation and taking-action module 83 may recommend a decision for the given situation and provide a taking-action according to the decision. To this end, the recommendation and taking-action module 83 may receive the analysis result and the prediction result from the determination and prediction module 82.

FIG. 7 is a diagram showing a configuration further including DNA tools in the artificial intelligence unit using deep learning-based self-adaptive training technology according to an embodiment of the present disclosure.

As shown in FIG. 7, the artificial intelligence unit 130 using deep learning-based self-adaptive training technology according to an embodiment of the present disclosure may be configured to further include a DNA tool 90.

The DNA tools 90 may provide a plurality of tools to the element deriving means 60, the training engine 70 and the taking-action means 80. That is, the DNA tools 90 may provide tools to help the element deriving means 60, the training engine 70, and the taking-action means 80 perform respective functions thereof, respectively.

More specifically, the DNA tools 90 may include a conversion tool 91 for converting unstructured data into text, an extraction tool 92 for extracting information, and a combination tool 93 that connects the chains and blocks necessary for self-organizing the DNA missions and self-construction of the DNA model to each other.

Further, the DNA tools 90 may further include a self-adaptation tool 94 to help the organizing module 71, the construction module 72 and the training module 73 respectively perform self-organization of the DNA mission, self-construction and self-training of the DNA model.

FIG. 8 is a diagram showing an operation flowchart for illustrating a hazardous substance detection method using artificial intelligence according to an embodiment of the present disclosure.

Referring to FIG. 8, in the hazardous substance detection system 100 using artificial intelligence according to an embodiment of the present disclosure, the computer device 40 executes deep learning on the first matching in S1110, wherein the database 42 is configured to store therein the first matching of a component, a chemical formula, an atom with the largest atomic number, and an X-ray color with an object name.

For example, the first matching may include matching between the object name salt, and the component sodium chloride, the chemical formula NaCl, the atomic number 17 of the atom (Cl) with the largest atomic number, and the X-ray color the green.

In the hazardous substance detection system 100 using artificial intelligence according to an embodiment of the present disclosure, the computer device 40 executes deep learning on the first matching in S1120, wherein the database 42 is configured to store therein the second matching of a state, a component, a chemical formula, an atom with the largest atomic number and an X-ray color with a hazardous substance.

For example, the second matching may include matching between the hazardous substance ammonium nitrate, the state the gas, the chemical formula $NH_4NO_3$, the atomic number 8 of oxygen (O) with the largest atomic number, and the X-ray color the orange.

As described above, the hazardous substance detection system 100 using artificial intelligence according to an embodiment of the present disclosure may execute the deep learning on the object name and all hazardous substances and compares the X-ray color of each of hazardous substances with the X-ray color of the object, thereby rapidly detecting the hazardous substance at airports, ports, military bases, event halls, stadiums, exhibition halls, performance halls, government buildings, and VIP guard places.

Then, the X-ray output means 20 outputs X-rays to the inspection target object in S1130.

In this regard, the X-ray irradiated to the inspection target object transmits through the object and then enters the X-ray detector 30.

Then, the X-ray detector 30 generates and outputs the X-ray image and the X-ray color resulting from the X-rays transmitting through the inspection target object in S1140.

In this regard, the atom having the largest atomic number among atoms constituting each of an object of the object name and the hazardous substance is defined as a representative atom, wherein in a first group, the representative atom has the atomic number in a range of atomic numbers 1 to 10 in the periodic table; wherein in a second group, the representative atom has the atomic number in a range of atomic numbers 12 to 18 in the periodic table; wherein in a third group, the representative atom has the atomic number in a range of atomic numbers 20 to 40 in the periodic table; and wherein in a fourth group, the representative atom has the atomic number in a range of atomic numbers 42 to 118 in the periodic table. In S1140, the X-ray detector displays, as the X-ray color: first color data when the inspection target object belongs to the first group; second color data when the inspection target object belongs to the second group; third color data when the inspection target object belongs to the third group; and fourth color data when the inspection target object belongs to the fourth group. The first color data includes an orange-based color, the second color data includes a green-based color, the third color data includes a blue-based color, and the fourth color data includes a black-based color.

That is, hydrogen (H) of the atomic number 1 to neon (Ne) of the atomic number 10 may be displayed in the first color, which is an orange-based color. Magnesium (Mg) of the atomic number 12 to Argon (Ar) of the atomic number 18 may be displayed in the second color, which is a green-based color. Calcium (Ca) of the atomic number 20 to zirconium (Zr) of the atomic number 40 may be displayed in a third color, which is a blue-based color. Finally, molybdenum (Mo) of the atomic number 42 to Oganesson (Og) of the atomic number 118 may be displayed in a fourth color, which is a black-based color.

For example, when the inspection target object is a glass bottle, the X-ray detector 30 generates an X-ray image depicting the shape of the glass bottle based on the X-rays transmitting through the inspection target object and outputs the X-ray color. The X-ray color includes: a green color corresponding to an atom (Si) having the largest atomic number among atoms constituting the glass bottle; and an orange or black color corresponding to an atom having the largest atomic number among atoms constituting a substance received in the glass bottle.

Then, the computer device 40 may determine whether the inspection target object is or contains a hazardous substance, based on the X-ray image, the X-ray color, and the deep learning results in S1150.

For example, the computer device 40 may determine that the inspection target object is the glass bottle based on the X-ray image, based on the deep learning results; determine that the inspection target object contains the hazardous substance based on the X-ray color including the orange or black color; and output a warning message and/or a warning sound.

More specifically, the inspection target object is a glass bottle containing nitromethane therein. The X-ray output means outputs the X-rays to the glass bottle. The X-ray detector generates an X-ray image including a shape of the glass bottle and outputs the X-ray color. The X-ray color includes: a green color corresponding to an atom (Si) having the largest atomic number among atoms constituting the glass bottle; and an orange color corresponding to an atom (O) having the largest atomic number among atoms constituting nitromethane ($CH_3NO_2$) received in the glass bottle. The computer device 40 is configured to: determine that the inspection target object is the glass bottle based on the X-ray image, based on the deep learning results; determine that the inspection target object contains the hazardous substance based on the X-ray color including the orange color; and output a warning message and/or a warning sound.

Further, the inspection target object is a glass bottle containing a radioactive substance therein. The X-ray output means outputs the X-rays to the glass bottle, and the X-ray detector generates an X-ray image including a shape of the glass bottle and outputs the X-ray color, wherein the X-ray color includes: a green color corresponding to an atom (Si) having the largest atomic number among atoms constituting the glass bottle; and a black color corresponding to an atom having the largest atomic number among atoms constituting the radioactive substance received in the glass bottle. The computer device is configured to: determine that the inspection target object is the glass bottle based on the X-ray image, based on the deep learning results; determine that the inspection target object contains the hazardous substance based on the X-ray color including the black color; and output a warning message and/or a warning sound.

In one example, when the substance is in a liquid state, the substance may be contained in a container that is sold in consideration of harmfulness to the human body and may be inspected while being received therein. Even when the substance is in a gas state, the substance may be contained in a commercially available container and may be inspected while being received therein.

For example, when water is contained in a tumbler container made of iron (Fe), the tumbler container made of iron is displayed in a blue color, and water inside the tumbler container is displayed in the orange color. In any area of the tumbler container, the orange and blue may be displayed at the same time because water is present therein. In this regard, the reader may estimate the amount of water remaining inside the tumbler container based on a distribution map of the orange color.

Figure 9:
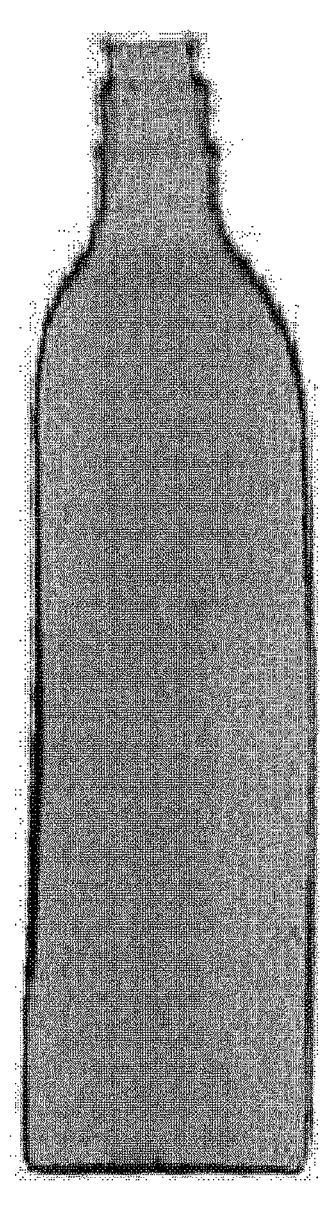
FIG. 9 is an X-ray image showing a state in which water is contained inside a glass bottle according to an embodiment of the present disclosure.

In another example, as shown in FIG. 9, when the glass bottle contains water, the glass bottle is displayed in green-based color, and the water inside the glass bottle is displayed in orange-based color. FIG. 9 is an X-ray image showing a state in which the water is contained inside the glass bottle according to an embodiment of the present disclosure.

In another example, when a glass bottle contains CO 2 gas therein, the glass bottle is displayed in green-based color, and the CO 2 gas inside the glass bottle is displayed in the orange-based color.

In another example, a butane gas container made of iron (Fe) contains butane gas ($C_4H_{10}$) therein. The iron-based butane gas container passes through the X-ray apparatus. Thus, the thin iron-based container is displayed in the blue-based color, and the butane gas inside the container is displayed in the orange-based color. In any area of the butane gas container, the orange-based and blue-based colors are displayed at the same time because liquefied butane gas is present therein. In this regard, the reader may estimate the amount of butane gas remaining inside the butane gas container based on the distribution map of the orange-based color.

In this way, the color displayed according to the type of the substance may be identified based on an imaging result of the substance directly in the state of being contained in the container.

During the inspection, the object is displayed as one of the first to fourth colors. Thus, the computer device may roughly determine which group in the periodic table the atom constituting the object belongs to.

Specifically, when the object to be inspected is inspected with an X-ray apparatus that displays a four-color image, the color of the group including the atom with the largest atomic number among atoms constituting the object is displayed. In this regard, the computer device checks the displayed color. The computer device may compare the displayed color with a color estimated based on a molecular formula of the material of the object and determine, based on the comparing result, which group among the first to fourth groups the atom with the largest atomic number belongs to.

For example, water ($H_2O$) may be inspected. Water includes two hydrogens and one oxygen. The atom with the largest atomic number is oxygen (O). Thus, the orange-based color corresponding to the group including oxygen (O) should be displayed. During the X-ray inspection, when the orange-based color is displayed, it is determined that the inspect target object is water. However, when the green-based color, the blue-based color or the black-based color instead of the orange-based color is displayed, it is determined that the inspection target object is not water. When the X-ray color is displayed in the black-based color, it may be determined whether the atom having the largest atomic number among atoms contained in the object belongs to the fourth group.

In another example, flour is inspected. Flour contains starch ($C_6H_{10}O_5$) ($H_2O$), gluten, etc. which are made of polysaccharide carbohydrates and thus is composed of tens of atoms. The atom with the largest atomic number is oxygen (O). Thus, the orange-based color corresponding to the group including oxygen (O) should be displayed. During the X-ray inspection, when the orange-based color is displayed, it is determined that the inspect target object is flour. However, when the green-based color, the blue-based color or the black-based color instead of the orange-based color is displayed, it is determined that the inspection target object is not the flour. When the X-ray color is displayed in the blue-based color, it may be determined whether the atom having the largest atomic number among atoms contained in the object belongs to the third group.

In another example, nitric acid ($HNO_3$) is inspected. Among the atoms included in the nitric acid, the atom with the largest atomic number is oxygen (O). Thus, the orange-based color should be displayed during the X-ray inspection.

In another example, sulfuric acid ($H_2SO_4$). among the atoms included in the sulfuric acid ($H_2SO_4$), the atom with the largest atomic number is sulfur (S). Thus, the green-based color should be displayed during the X-ray inspection.

In another example, ammonium nitrate ($NH_4NO_3$) is inspected. Among the atoms included in the ammonium nitrate ($NH_4NO_3$), the atom with the largest atomic number is oxygen (O). Thus, the orange-based color should be displayed during the X-ray inspection.

When the system inspects an object containing sodium (Na) of the atomic number 11, potassium (K) of the atomic number 19, and niobium (Nb) of the atomic number 41 in the periodic table, these three atoms do not affect color determination when reading X-rays.

Specifically, when inspecting an object containing the atom of the atomic number 11 and atoms of atomic numbers other than atomic number 11 in the periodic table, the X-ray color is displayed as color corresponding to the group including the atom with the largest atomic number among the atoms of the atomic numbers other than the atomic number 11. The computer device may compare the displayed color with a color estimated based on a molecular formula of the material of the object, and may determine, based on the comparing result, and determine, based on the comparing result, which group among the first to fourth groups the atom with the largest atomic number among the atoms of the atomic numbers other than the atomic number 11 belongs to.

For example, salt (NaCl) is inspected. Salt includes sodium (Na) and chlorine (Cl). Sodium (Na) does not affect the color determination. The green-based color corresponding to the group including chlorine (Cl) which is the atom with the largest atomic number among atoms other than sodium (Na) should be displayed. During X-ray inspection, when the green-based color is displayed, the inspected object is determined to be salt. However, when the orange-based color, the blue-based color or the black-based color instead of the green-based color is displayed, it is determined that the inspection target object is not the salt. When the X-ray color is displayed in the blue-based color, it may be determined whether the atom having the largest atomic number among atoms contained in the object belongs to the third group.

Similarly, when inspecting an object containing the atom of the atomic number 19 and atoms of atomic numbers other than atomic number 19 in the periodic table, the X-ray color is displayed as color corresponding to the group including the atom with the largest atomic number among the atoms of the atomic numbers other than the atomic number 19. The computer device may compare the displayed color with a color estimated based on a molecular formula of the material of the object, and may determine, based on the comparing result, and determine, based on the comparing result, which group among the first to fourth groups the atom with the largest atomic number among the atoms of the atomic numbers other than the atomic number 19 belongs to.

Similarly, when inspecting an object containing the atom of the atomic number 41 and atoms of atomic numbers other than atomic number 41 in the periodic table, the X-ray color is displayed as color corresponding to the group including the atom with the largest atomic number among the atoms of the atomic numbers other than the atomic number 41. The computer device may compare the displayed color with a color estimated based on a molecular formula of the material of the object, and may determine, based on the comparing result, and determine, based on the comparing result, which group among the first to fourth groups the atom with the largest atomic number among the atoms of the atomic numbers other than the atomic number 41 belongs to.

Therefore, the determination method of the hazardous substance using the four-color X-ray apparatus according to the present disclosure uses the x-ray apparatus displaying a four-color image and the periodic table, and the property that a color corresponding to the group including the atom with the largest atomic number among atoms constituting the object is displayed, and thus determines which group in the periodic table the atom with the largest atomic number belongs to.

In this way, the hazardous substance determination method according to the present disclosure has the effect of quickly and accurately reading and identifying the atoms constituting the object in a scientific manner. Further, the method may estimate the X-ray color of the object only based on the molecular formula of the material of the object.

Furthermore, the hazardous substance determination method of the present disclosure effectively may screen prohibited items in major national facilities, such as airports, ports, military bases, event halls, stadiums, exhibition halls, performance halls, government buildings, and spaces where VIPs are guarded.

For example, the object that humans may eat or drink is mainly composed of organic materials. Thus, the orange-based color should be displayed on the X-ray image when inspecting the object using the X-ray detector. However, when the green-based or blue-based color is displayed, the reader may know that there is an abnormality. In this case, the security manager may block the import of hazardous substances based on a checking result of the exact use and material of the imported goods.

Further, a chemical substance is capable of mass destruction and is hazardous. In particular, the radioactive object is a high-risk object that may contaminate a wide area and paralyze national functions. All radioactive objects are included in the fourth group in the periodic table, and thus have the X-ray color of a dark black color.

In addition, a unique radioactive pattern occurs around the radioactive object due to the radioactive radiation phenomenon that only the radioactive object has. Thus, the method may be able to easily check the authenticity of the radioactive object and cope therewith.

The chemical agent comes into contact with the human body, and thus attacks the central nervous system and causes blistering on the skin, causes the choking action or and interferes with transport of oxygen in the blood. The dangerous chemical object may be tested using X-rays.

However, most of the chemical agents have a molecular formula in which phosphorus (P) or chlorine (Cl) components are included. For example, phosphorus (P) and sulfur (S) are contained in a VX (nerve agent $C_{11}H_{26}NO_2PS$) agent. Thus, the X-ray color thereof may be the green-based color.

Therefore, the hazardous substance determination method of the present disclosure may predict that the X-ray color of the chemical agent is the green-based color in a simple manner. and the same result was obtained based on a result of an actual experiment.

Thus, when using the hazardous substance detection system and method using artificial intelligence according to the present disclosure, the variation in the reading ability of the X-ray apparatus which is dependent on the reader's experience may be narrowed so that the national institution may block introduction of hazardous substances in advance. Thus, the hazardous substance detection system and method may play an important role in ensuring the safety and livelihood of citizens, and ultimately achieving national stability.

For example, in order to determine whether an object is a dangerous object such as an explosive, a terrorist article, or a cartridge case, the object passes through the X-ray scanner and the X-ray image thereof is taken. The captured image is displayed on the screen. The reader may determine, based on the image, whether the object is a hazardous object.

Conventionally, a method of reading an organic material and an inorganic material is used based on a comparing result of colors based on transmittances of X-rays emitted at different angles. However, the hazardous substance detection system and method using artificial intelligence according to the present disclosure may determine what group in the periodic table the atom with the largest atomic number, that is, the heaviest atom among the atoms constituting the object belongs to, regardless of the density, thickness, and transmittance of the object, and may determine whether the object is hazardous based on the determination result. Thus, the hazardous substance detection system and method using artificial intelligence according to the present disclosure may be achieve more accurate reading of the object, compared to the conventional method.

The determination method of the atom using the four-color X-ray apparatus determines which group an atom that constitutes sugar belongs to using the HI-SCAN 5030i apparatus from Smith Detection Company.

First, the atoms are inspected with an X-ray apparatus, and elements of commonly displayed colors are classified.

The inspection target object has a molecular formula of the sugar ($C_{12}H_{22}O_{11}$) Thus, the orange-based color corresponding to the group including the atom with the largest atomic number should be displayed.

10 g of the sugar as the inspection target object is placed on a disposable weighing dish [width 8 cm*length 8 cm*depth 2 cm; polystyrene] and the dish passes through an X-ray apparatus HI-SCAN 5030i for inspection. In this regard, a distance between the sugar and the tube of the X-ray apparatus is maintained at 30 cm.

During the inspection, the color (orange-based color) estimated from the molecular formula of the object, and the color displayed on the screen are compared with each other. The color displayed on the screen is the green-based color. Thus, the color (orange-based color) estimated from the molecular formula of the object, and the color displayed on the screen do not match each other. In this case, it may be identified that the inspection target object is not sugar. Further, it may be determined that the atom having the largest atomic number among the atoms included in the inspection target object is an atom belonging to the second group corresponding to the green-based color.

The present disclosure may realize the hazardous substance detection system and method using artificial intelligence in which X-ray from an X-ray apparatus is irradiated to an inspection target object, and the object is identified based on a property that a color of the X-ray transmitting through the object corresponds to an atom having the largest atomic number in the periodic table among atoms constituting the object, and thus the system and the method perform deep learning on the X-ray color of each of hazardous substances, and compares the X-ray color of each of hazardous substances with the X-ray color of the object, thereby rapidly detecting the hazardous substance at airports, ports, military bases, event halls, stadiums, exhibition halls, performance halls, government buildings, and VIP guard places.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. The scope of protection of the present disclosure should be interpreted by the claims, and all technical ideas within the scope of the present disclosure should be interpreted as being included in the scope of the present disclosure.

INDUSTRIAL APPLICABILITY

The system and the method according to the present disclosure may be applied to a hazardous substance detection device installed in airports, ports, military bases, event halls, stadiums, exhibition halls, performance halls, government buildings, VIP guard places, etc.

What is claimed is:

1. A hazardous substance detection system using artificial intelligence, the system comprising:

an X-ray output means for outputting X-rays to an inspection target object;

an X-ray detector configured to generate and output an X-ray image and an X-ray color resulting from the X-rays transmitting through the inspection target object;

database configured to store therein first matching of a component, a chemical formula, an atom with the largest atomic number, and an X-ray color with an object name, and second matching of a state, a component, a chemical formula, an atom with the largest atomic number and an X-ray color with a hazardous substance; and a computer device electrically connected to the X-ray detector, wherein the computer device is configured to:

execute deep learning on each of the first and second matchings using a deep learning algorithm; and determine whether the inspection target object is or contains a hazardous substance, based on the X-ray image, the X-ray color, and the deep learning results, wherein when the inspection target object contains sodium (Na) of an atomic number 11 and other atoms other than sodium (Na) in the periodic table, the X-ray detector is configured to display, as the X-ray color, a color corresponding to a group including an atom having the largest atomic number among the atoms other than the sodium (Na), wherein when the inspection target object contains potassium (K) of an atomic number 19 and other atoms other than potassium (K) in the periodic table, the X-ray detector is configured to display, as the X-ray color, a color corresponding to a group including an atom having the largest atomic number among the atoms other than the potassium (K), wherein when the inspection target object contains niobium (Nb) of an atomic number 41 and other atoms other than niobium (Nb) in the periodic table, the X-ray detector is configured to display, as the X-ray color, a color corresponding to a group including an atom having the largest atomic number among the atoms other than the niobium (Nb), wherein when the inspection target object is free of the sodium (Na), the potassium (K), and the niobium (Nb), the X-ray detector is configured to display, as the X-ray color, a color corresponding to a group including an atom having the largest atomic number among atoms contained in the object, wherein the computer device includes a processor, wherein the processor is configured to derive an element as the input information to the training engine from the input data including structured data and unstructured data, wherein the processor is configured to:

convert the unstructured data including an image and a voice except for a text into text data;

extract information from the converted text data; and derive the elements to be input to the training engine from the extracted information, wherein processor is configured to self-organize DNA mission using the elements derived by comparing and evaluating the elements input over time with elements within a mission of an organization based on each predefined group, and organizing and generating a DNA mission that changes over time, self-construct deep learning-based artificial neural network DNA model using the self-organized DNA, mission by constructing the artificial neural network DNA model capable of performing the deep learning by itself by using the DNA mission, and train the self-constructed DNA model, wherein, based on a training result, processor is configured to perform situation understanding and scheduling, decision making and prediction, and recommendation and taking-action, and wherein the processor is configured to:

understand a given situation or grasp an intention, and to provide scheduling to a decision maker based on a result of understanding the situation or understanding the intention;

identify the object name based on the X-ray image input from the X-ray detector, to predict whether the object is or contains a hazardous substance based on the X-ray color, and to provide a prediction result; and recommend, based on an analysis result and prediction result, a decision for the given situation and to provide a taking-action according to the decision.

2. The system of claim 1, wherein the atom having the largest atomic number among atoms constituting each of an object of the object name and the hazardous substance is defined as a representative atom, wherein the database is configured to store therein:

a first correspondence between a first group and first color data, wherein in the first group, the representative atom has the atomic number in a range of atomic numbers 1 to 10 in the periodic table;

a second correspondence between a second group and second color data, wherein in the second group, the representative atom has the atomic number in a range of atomic numbers 12 to 18 in the periodic table;

a third correspondence between a third group and third color data, wherein in the third group, the representative atom has the atomic number in a range of atomic numbers 20 to 40 in the periodic table; and a fourth correspondence between a fourth group and fourth color data, wherein in the fourth group, the representative atom has the atomic number in a range of atomic numbers 42 to 118 in the periodic table.

3. The system of claim 2, wherein the X-ray detector is configured to display, as the X-ray color:

the first color data when the inspection target object belongs to the first group;

the second color data when the inspection target object belongs to the second group;

the third color data when the inspection target object belongs to the third group; and the fourth color data when the inspection target object belongs to the fourth group.

4. The system of claim 3, wherein the first color data includes an orange-based color, the second color data includes a green-based color, the third color data includes a blue-based color, and the fourth color data includes a black-based color.

5. The system of claim 1, wherein the inspection target object is a glass bottle containing nitromethane therein, wherein the X-ray output means outputs the X-rays to the glass bottle, wherein the X-ray detector generates an X-ray image including a shape of the glass bottle and outputs the X-ray color, wherein the X-ray color includes:

a green color corresponding to an atom (Si) having the largest atomic number among atoms constituting the glass bottle; and an orange color corresponding to an atom (O) having the largest atomic number among atoms constituting nitromethane ($CH_3NO_2$) received in the glass bottle, wherein the computer device is configured to:

determine that the inspection target object is the glass bottle based on the X-ray image, based on the deep learning results;

determine that the inspection target object contains the hazardous substance based on the X-ray color including the orange color; and output a warning message and/or a warning sound.

6. The system of claim 1, wherein the inspection target object is a glass bottle containing a radioactive substance therein, wherein the X-ray output means outputs the X-rays to the glass bottle, wherein the X-ray detector generates an X-ray image including a shape of the glass bottle and outputs the X-ray color, wherein the X-ray color includes:

a green color corresponding to an atom (Si) having the largest atomic number among atoms constituting the glass bottle; and a black color corresponding to an atom having the largest atomic number among atoms constituting the radioactive substance received in the glass bottle, wherein the computer device is configured to:

determine that the inspection target object is the glass bottle based on the X-ray image, based on the deep learning results;

determine that the inspection target object contains the hazardous substance based on the X-ray color including the black color; and output a warning message and/or a warning sound.

7. A hazardous substance detection method using artificial intelligence based on first matching of a component, a chemical formula, an atom with the largest atomic number, and an X-ray color with an object name, and second matching of a state, a component, a chemical formula, an atom with the largest atomic number and an X-ray color with a hazardous substance, wherein the method comprises:

(a) executing, by a computer device, deep learning on the first matching using a deep learning algorithm;

(b) executing, by the computer device, deep learning on the second matching using the deep learning algorithm;

(c) outputting, by X-ray output means, X-rays to an inspection target object;

(d) generating and outputting, by an X-ray detector, an X-ray image and an X-ray color resulting from the X-rays transmitting through the inspection target object; and (e) determining whether the inspection target object is or contains a hazardous substance, based on the X-ray image, the X-ray color, and the deep learning results, wherein in the (d), when the inspection target object contains sodium (Na) of an atomic number 11 and other atoms other than sodium (Na) in the periodic table, the X-ray detector displays, as the X-ray color, a color corresponding to a group including an atom having the largest atomic number among the atoms other than the sodium (Na), wherein in the (d), when the inspection target object contains potassium (K) of an atomic number 19 and other atoms other than potassium (K) in the periodic table, the X-ray detector displays, as the X-ray color, a color corresponding to a group including an atom having the largest atomic number among the atoms other than the potassium (K), wherein in the (d), when the inspection target object contains niobium (Nb) of an atomic number 41 and other atoms other than niobium (Nb) in the periodic table, the X-ray detector displays, as the X-ray color, a color corresponding to a group including an atom having the largest atomic number among the atoms other than the niobium (Nb), wherein in the (d), when the inspection target object is free of the sodium (Na), the potassium (K), and the niobium (Nb), the X-ray detector displays, as the X-ray color, a color corresponding to a group including an atom having the largest atomic number among atoms contained in the object, wherein the computer device includes a processor, wherein the processor is configured to derive an element as the input information to the training engine from the input data including structured data and unstructured data, wherein the processor is configured to:

convert the unstructured data including an image and a voice except for a text into text data;

extract information from the converted text data; and derive the elements to be input to the training engine from the extracted information, wherein the processor is configured to self-organize DNA mission using the elements derived by comparing and evaluating the elements input over time with elements within a mission of an organization based on each predefined group, and organizing and generating a DNA mission that changes over time, self-construct deep learning-based artificial neural network DNA model using the self-organized DNA, mission by constructing the artificial neural network DNA model capable of performing the deep learning by itself by using the DNA mission, and train the self-constructed DNA model, wherein, based on a training result, the processor is configured to perform situation understanding and scheduling, decision making and prediction, and recommendation and taking-action, and wherein the processor is configured to:

understand a given situation or grasp an intention, and to provide scheduling to a decision maker based on a result of understanding the situation or understanding the intention;

identify the object name based on the X-ray image input from the X-ray detector, to predict whether the object is or contains a hazardous substance based on the X-ray color, and to provide a prediction result; and recommend, based on an analysis result and prediction result, a decision for the given situation and to provide a taking-action according to the decision.

8. The method of claim 7, wherein the atom having the largest atomic number among atoms constituting each of an object of the object name and the hazardous substance is defined as a representative atom, wherein in a first group, the representative atom has the atomic number in a range of atomic numbers 1 to 10 in the periodic table;

wherein in a second group, the representative atom has the atomic number in a range of atomic numbers 12 to 18 in the periodic table;

wherein in a third group, the representative atom has the atomic number in a range of atomic numbers 20 to 40 in the periodic table; and wherein in a fourth group, the representative atom has the atomic number in a range of atomic numbers 42 to 118 in the periodic table, wherein in the (d), the X-ray detector displays, as the X-ray color:

first color data when the inspection target object belongs to the first group;

second color data when the inspection target object belongs to the second group;

third color data when the inspection target object belongs to the third group; and fourth color data when the inspection target object belongs to the fourth group.

9. The method of claim 8, wherein the first color data includes an orange-based color, the second color data includes a green-based color, the third color data includes a blue-based color, and the fourth color data includes a black-based color.

10. The method of claim 8, wherein in the (c), the X-ray output means outputs the X-rays to a glass bottle as the inspection target object, wherein in the (d), the X-ray detector generates an X-ray image including a shape of the glass bottle and outputs the X-ray color, wherein the X-ray color includes:

a green color corresponding to an atom (Si) having the largest atomic number among atoms constituting the glass bottle; and an orange or black color corresponding to an atom having the largest atomic number among atoms constituting a substance received in the glass bottle, wherein the (e) includes:

determining that the inspection target object is the glass bottle based on the X-ray image, based on the deep learning results;

determining that the inspection target object contains the hazardous substance based on the X-ray color including the orange or black color; and outputting a warning message and/or a warning sound.

* * * * *